United States Patent
Wang

(10) Patent No.: US 8,054,773 B2
(45) Date of Patent: Nov. 8, 2011

(54) METHOD OF SELECTING APPLICATION AND HAND-HELD ELECTRONIC DEVICE

(75) Inventor: John C. Wang, Taoyuan County (TW)

(73) Assignee: HTC Corporation, Taoyuan, Taoyuan County (TW)

(*) Notice: Subject to any disclaimer, the term of this patent is extended or adjusted under 35 U.S.C. 154(b) by 729 days.

(21) Appl. No.: 12/061,803

(22) Filed: Apr. 3, 2008

(65) Prior Publication Data

US 2009/0005113 A1    Jan. 1, 2009

(30) Foreign Application Priority Data

Jun. 27, 2007    (TW) ................................ 96123383 A

(51) Int. Cl.
*H04W 4/00*    (2009.01)
*H04M 1/00*    (2006.01)

(52) U.S. Cl. ...... 370/313; 370/329; 370/341; 455/556.2

(58) Field of Classification Search .................. 370/252, 370/254–258, 310–350; 455/412.1–420
See application file for complete search history.

(56) References Cited

U.S. PATENT DOCUMENTS

| | | | |
|---|---|---|---|
| 6,028,604 A * | 2/2000 | Matthews et al. | 715/821 |
| 6,484,011 B1 * | 11/2002 | Thompson et al. | 455/3.06 |
| 6,725,022 B1 * | 4/2004 | Clayton et al. | 455/154.1 |
| 6,804,510 B1 * | 10/2004 | Bates et al. | 455/414.4 |
| 6,898,765 B2 * | 5/2005 | Matthews et al. | 715/815 |
| 6,928,262 B1 * | 8/2005 | Kanemitsu | 455/3.06 |
| 6,952,576 B2 * | 10/2005 | Fish et al. | 455/414.1 |
| 7,233,316 B2 * | 6/2007 | Smith et al. | 345/157 |
| 7,263,329 B2 * | 8/2007 | Acker | 455/3.02 |
| 7,395,041 B2 * | 7/2008 | Seppala et al. | 455/186.1 |
| 7,610,555 B2 * | 10/2009 | Klein et al. | 715/738 |
| 7,710,396 B2 * | 5/2010 | Smith et al. | 345/157 |
| 7,895,532 B2 * | 2/2011 | Scott et al. | 715/810 |
| 2006/0104237 A1 * | 5/2006 | Ryu | 370/328 |

\* cited by examiner

*Primary Examiner* — Tri H Phan

(74) *Attorney, Agent, or Firm* — Thomas, Kayden, Horstemeyer & Risley, LLP

(57) ABSTRACT

A method of selecting application and a hand-held electronic device are provided. The method of selecting application is used in a hand-held electronic device, wherein the hand-held electronic device is installed with several applications corresponding to several channel codes. The method of selecting application includes the following steps. Firstly, a selecting signal outputted from an input unit of the hand-held electronic device is received for choosing one of the channel codes. Next, the application corresponding to the chosen channel code is driven. Then, the driven application is displayed on a display unit of the hand-held electronic device.

8 Claims, 7 Drawing Sheets

METHOD OF SELECTING APPLICATION AND HAND-HELD ELECTRONIC DEVICE

This application claims the benefit of Republic of Taiwan application Ser. No. 096123383, filed Jun. 27, 2007, the subject matter of which is incorporated herein by reference.

BACKGROUND OF THE INVENTION

1. Field of the Invention

The invention relates in general to a selecting method and a hand-held electronic device, and more particularly to a method of selecting application and a hand-held electronic device thereof.

2. Description of the Related Art

With the advance and popularity of technology, various hand-held electronic devices such as mobile phone, personal digital assistant (PDA), have become a part of modern people's life. Meanwhile, the function of hand-held electronic devices becomes more complicated. Conventional operation mode enables the user to select a desired function by way of a selection menu incorporated with icons, text, or contents. As the number of function increases, the menu needs to include all function selection, hence making the menu too complicated to operate.

Please refer to FIGS. 1A and 1B. FIG. 1A is a diagram of a main menu of a conventional mobile phone. FIG. 1B is a diagram of a sub-menu of a conventional mobile phone. The electronic device 100 at least includes a display screen 110, a Talk key 122, an End key 124 and a control key 126. The display screen 110 displays a select frame 111, a plurality of main menu function icons 112 and a plurality of sub-menu function selections 113. The mobile phone is normally operated by a control key 126 which moves a select frame 111 upward/downward to a desired function icon, then the user press the Talk key 122 to enter the sub-function menu (as shown in FIG. 1B). Next, the user moves the select frame 111 to the desired function selection by the control key 126 and then presses the Talk key 122 to perform the particular function. If the user needs to choose another function, the user can press the End key 124 to return to the main menu and choose another function again by above conventional operation mode.

However, as the function of the mobile phone increases, the selection also becomes complicated. Therefore, the operation of the above menu also becomes difficult. When the user needs to operate a function selection, the user normally has to spend time searching from the menu, hence making the use inconvenient. Besides, due to the complication of menu selection, the user may not be able to remember and operate the path of some functions. Therefore, the user has to search again for each operation, causing inconvenience to the user. However, if the user is not familiar with the operation of the electronic device, the method of operating the menu is became difficult to the user so that the will of purchase is reduced.

SUMMARY OF THE INVENTION

The invention is directed to a method of selecting application and a hand-held electronic device capable of selecting the built-in applications of the electronic device by way of channel surfing.

According to a first aspect of the present invention, a method of selecting application is provided. The method of selecting application is used in a hand-held electronic device, wherein the hand-held electronic device is installed with several applications corresponding to several channel codes. The method of selecting application includes the following steps: Firstly, a selecting signal outputted from an input unit of the hand-held electronic device is received for choosing one of the channel codes. Next, the application corresponding to the chosen channel code is driven. Then, the driven application is displayed on a display unit of the hand-held electronic device.

According to a second aspect of the present invention, a method of selecting application used in a hand-held electronic device is provided. The hand-held electronic device is installed with several applications corresponding to several channel codes. The method of selecting application includes the following steps. Firstly, the application corresponding to one of the channel codes is displayed. Next, a selecting signal outputted from an input unit of the hand-held electronic device is received for choosing another one of the channel codes. Then, the application corresponding to the chosen channel code is driven. Next, the driven application corresponding to the chosen channel code is displayed on a display unit of the hand-held electronic device.

According to a third aspect of the present invention, a hand-held electronic device including a display unit, a storage unit, an input unit and a control unit is provided. The storage unit stores several applications corresponding to several channel codes. The input unit is used for outputting a selecting signal for choosing one of the channel codes. The control unit is used for driving the application corresponding to the chosen channel code and used for displaying the application on the display unit.

The invention will become apparent from the following detailed description of the preferred but non-limiting embodiments. The following description is made with reference to the accompanying drawings.

DETAILED DESCRIPTION OF THE INVENTION

Figure 1A:
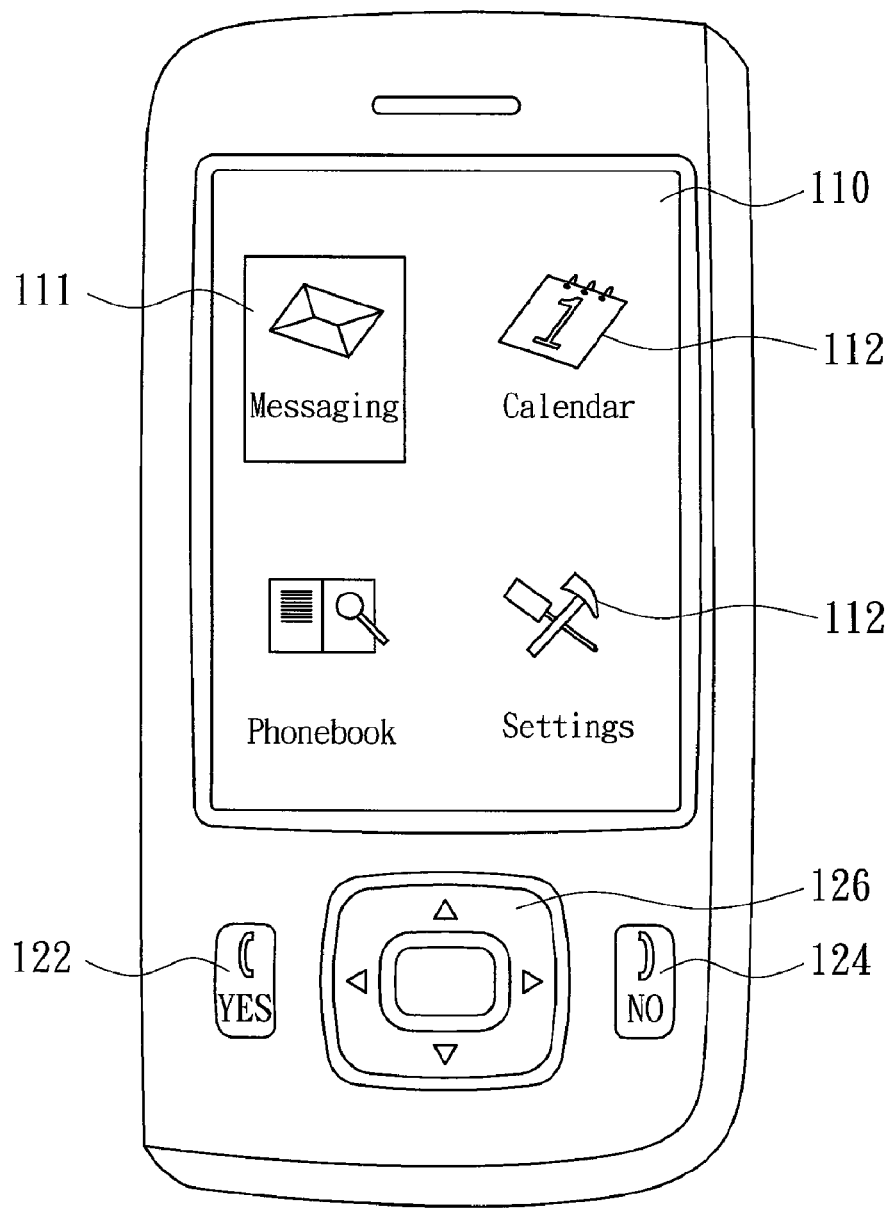
FIG. 1A (PriorArt) is a diagram of a main menu of a conventional mobile phone.
Figure 1B:
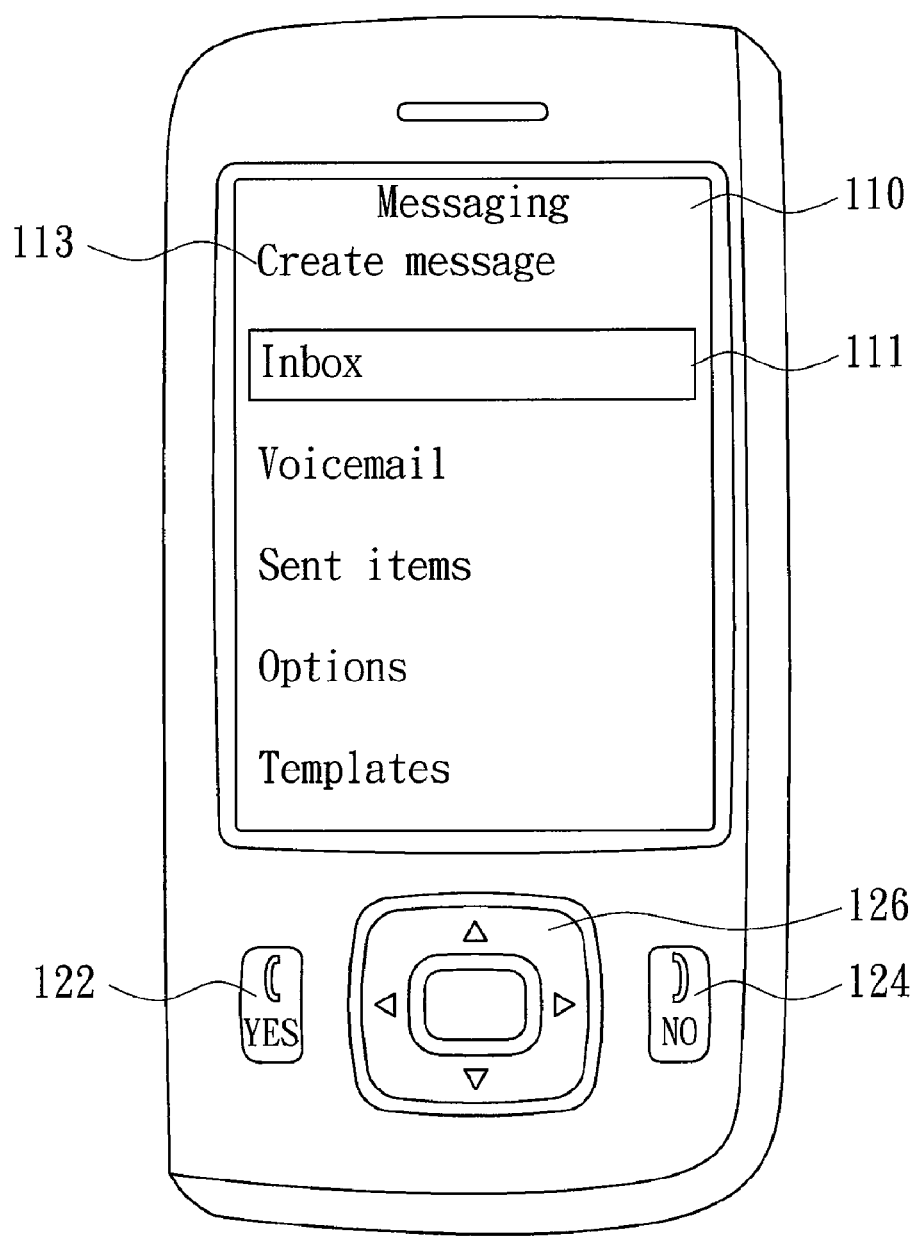
FIG. 1B (PriorArt) is a diagram of a sub-menu of a conventional mobile phone.
Figure 2:
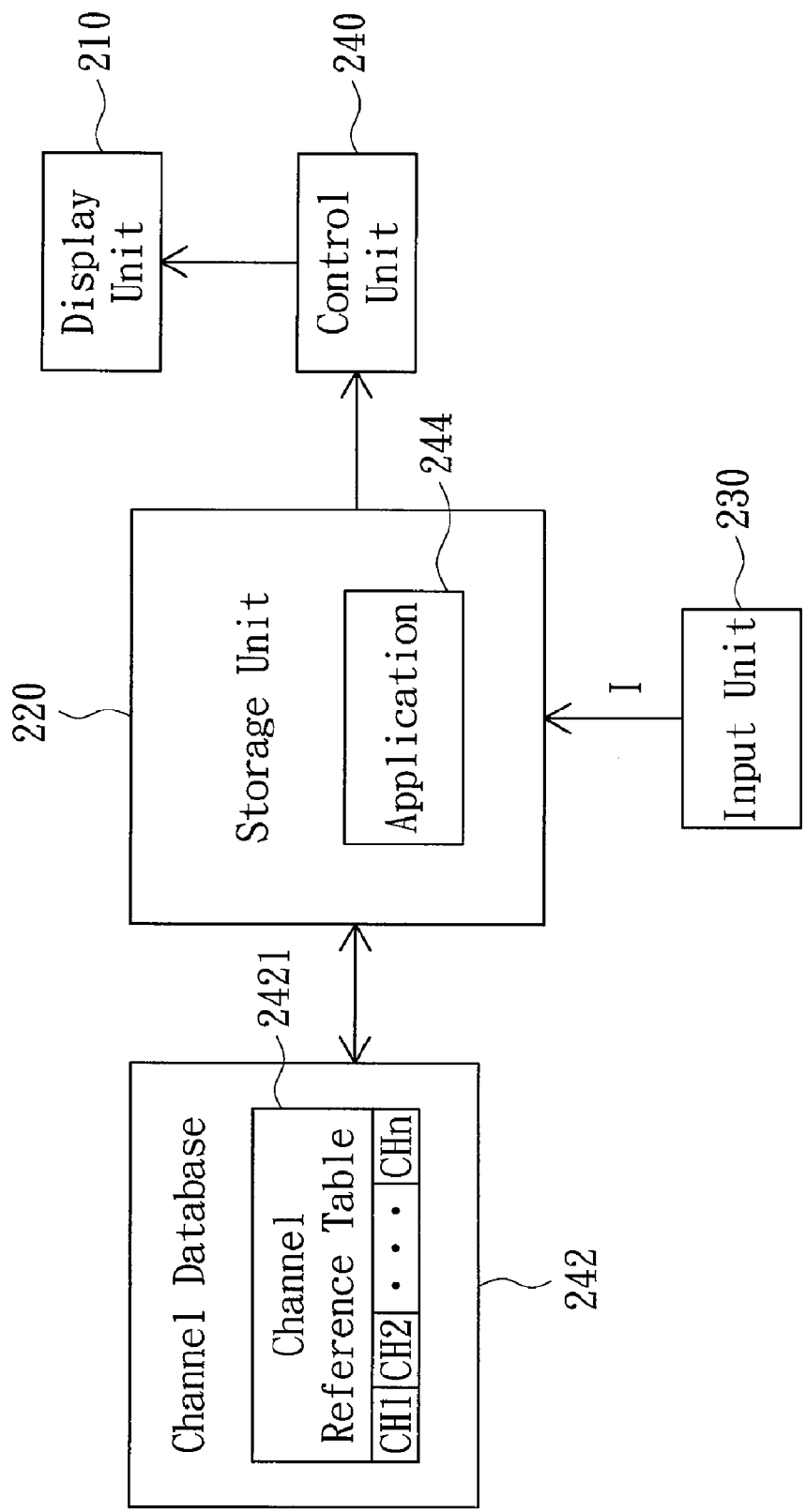
FIG. 2 is a block diagram of a hand-held electronic device according to an embodiment of the present invention.

Please referring to FIG. 2, a block diagram of a hand-held electronic device according to an embodiment of the present invention is shown. The hand-held electronic device 400 includes a display unit 210, a storage unit 220, an input unit 230 and a control unit 240. The storage unit 220 stores several applications 244 corresponding to several channel codes CHx. In other words, each channel code CHx corresponds to an application 244. Besides, the storage unit 220 can further be linked to a channel database 242, wherein the channel database 242 has a channel reference table 2421 recording each channel code CHx (x is a positive integer ranging from 1~m). The user can select a channel code CHn by the input unit 230. Meanwhile, the control unit 240 drives the application 244 corresponding to the chosen channel code CHn and displays the application 244 on the display unit 210.

Figure 3:
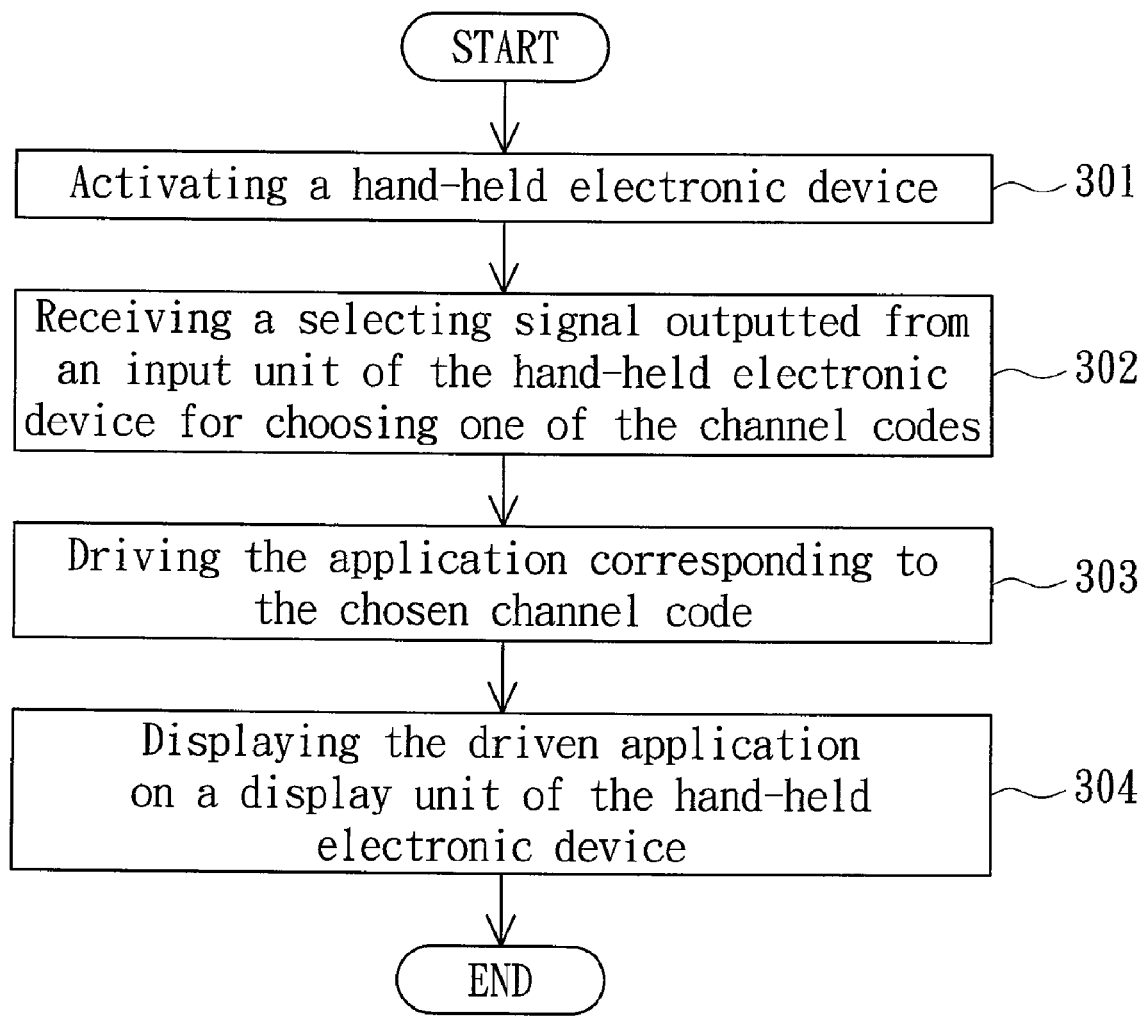
FIG. 3 is a flowchart of a method of operating the hand-held electronic device of FIG. 2.
Figure 4A:
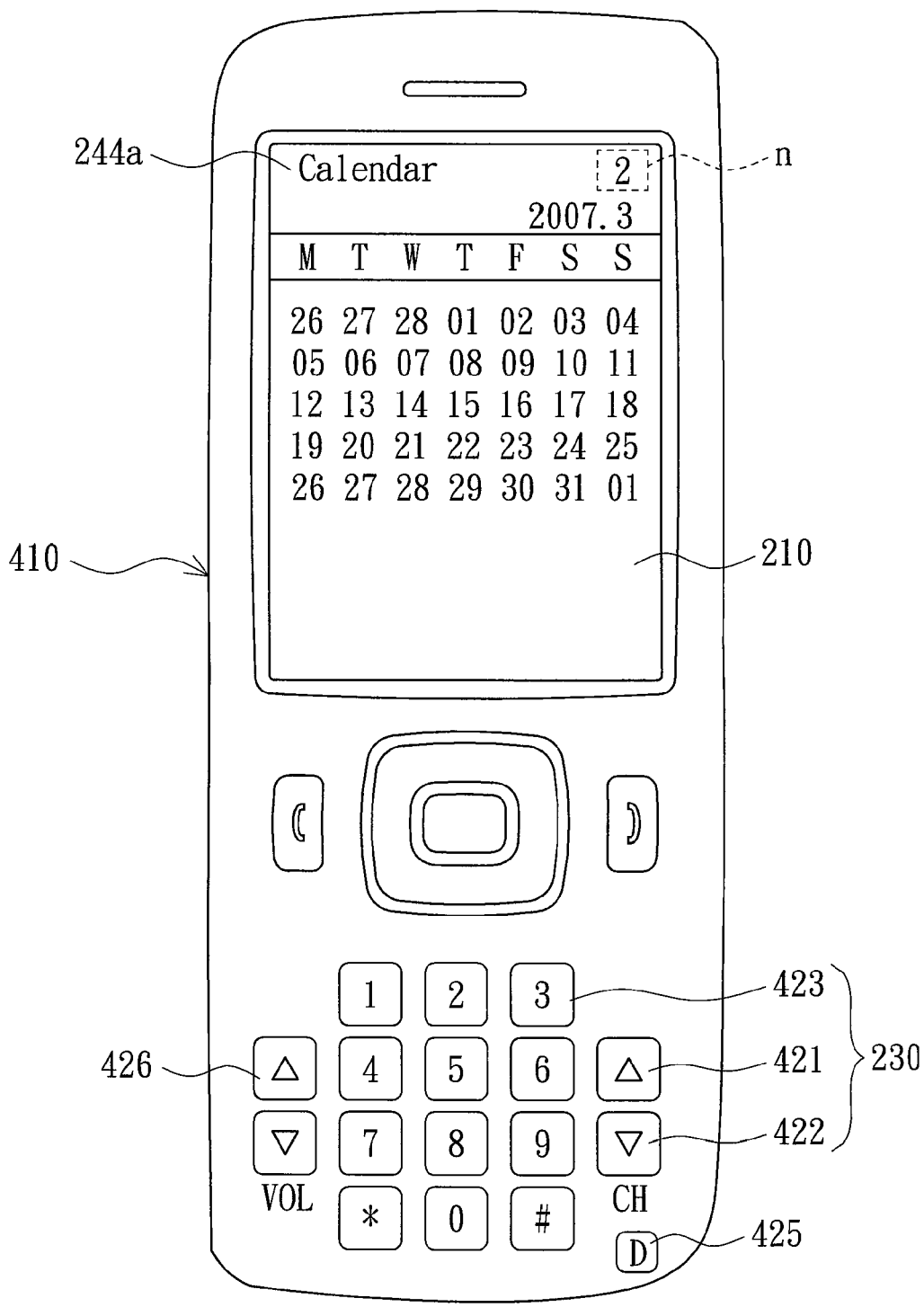
FIG. 4A is a diagram of the hand-held electronic device of FIG. 2 displaying channel code CH2.

Please refer to FIG. 3 and FIG. 4A. FIG. 3 is a flowchart of a method of operating the hand-held electronic device of FIG. 2. FIG. 4A is a diagram of the hand-held electronic device of FIG. 2 displaying channel code CH2. Firstly, the method begins at step 301, the hand-held electronic device 400 is activated. The hand-held electronic device 400 includes a casing 410, a display unit 210 and an input unit 230. The hand-held electronic device 400 is installed with several applications 244 corresponding to several channel codes CHx.

Next, the method proceeds to step 302, a selecting signal I outputted from an input unit 230 of the hand-held electronic device 400 is received for choosing the channel codes CHx. In the present embodiment of the invention, the channel codes CHx correspond to several applications 244. In other words, each channel code CHx corresponds to an application 244. Please refer to FIG. 4A, the input unit 230 further includes a forward key 421, a backward key 422 and a number key 423, wherein the user presses the forward key 421 and the backward key 422 for outputting the selecting signal I for selecting the applications 244 corresponding to the channel codes CHm. By way of selecting, the user can search for necessary application 244 by the input unit 230. That is, the selecting method is similar to finding the desired TV program by pressing forward/backward the channel control key of the channel selector. Like the user can choose the desired TV program by pressing the number key of the channel selector, the user also can input the desired channel code CHm to the hand-held electronic device 400 by pressing the number key 423 and jump to the application 244 corresponding to the channel code CHm directly.

Then, the method proceeds to step 303, the control unit 240 drives the application 244 corresponding to the chosen channel code CHm. Next, the method proceeds to step 304, the driven application 244 is displayed on the display unit 210 of the hand-held electronic device 400.

In the present embodiment of the invention, the hand-held electronic device 400 is a mobile phone or a personal digital assistant (PDA), and several channel codes CHx respectively correspond to different applications 244. In other words, the functions of a mobile phone are respectively allocated to different channels, so the desired function could be finded by way of channel surfing. Thus, the user's operating would become more convenient in operating the hand-held electronic device 400.

Figure 4B:
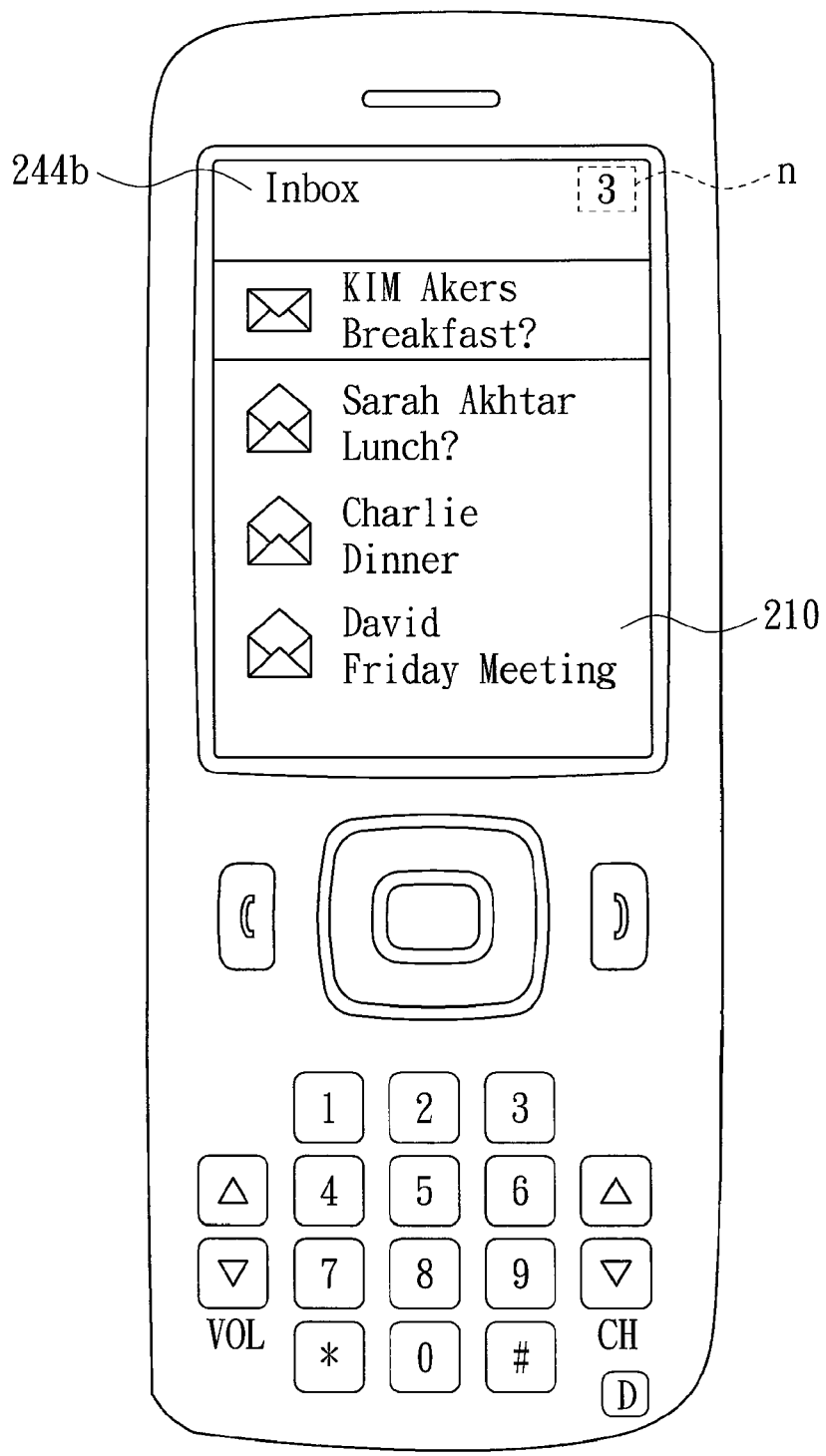
FIG. 4B is a diagram of the hand-held electronic device of FIG. 2 displaying channel code CH3.
Figure 4C:
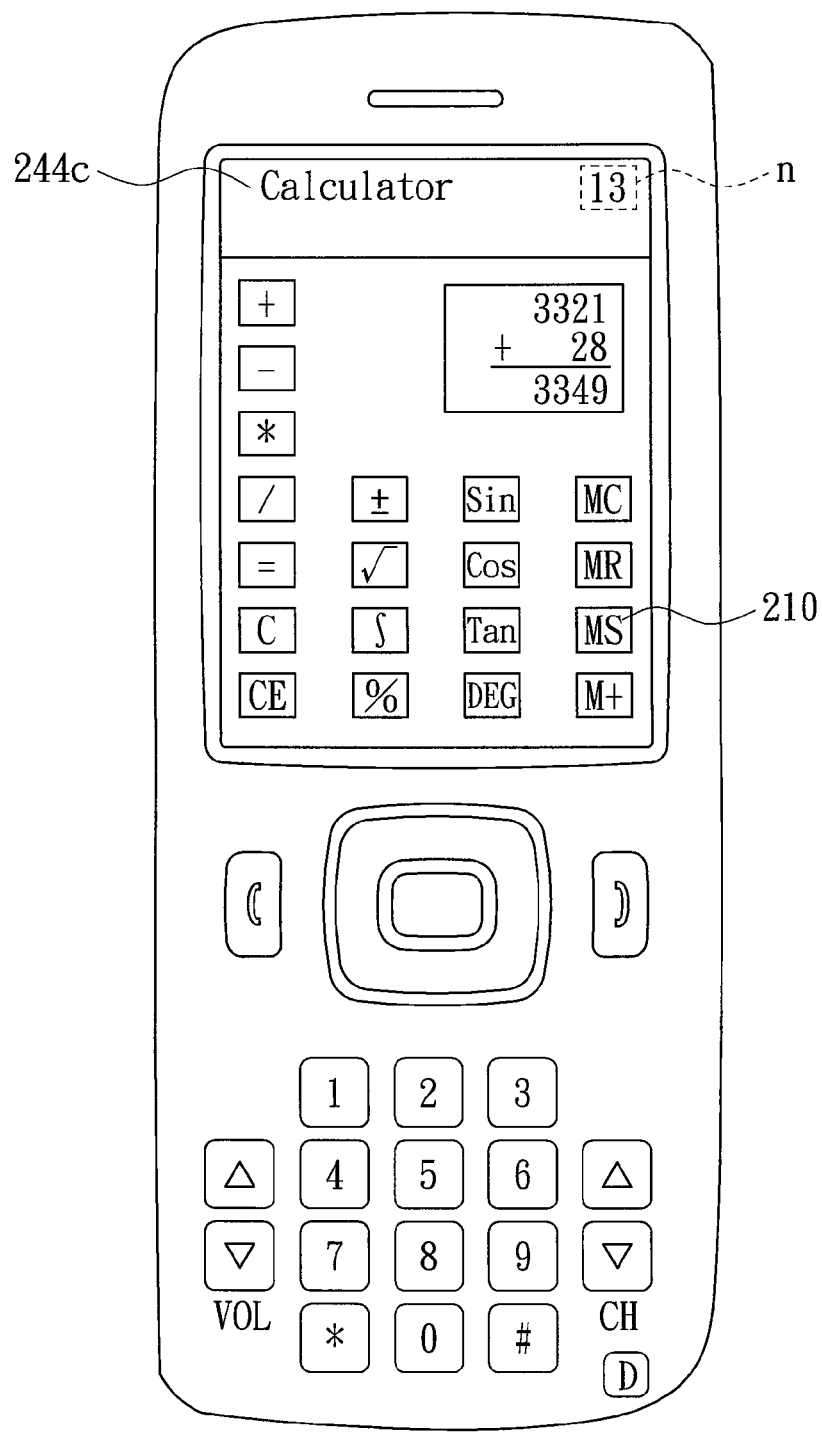
FIG. 4C is a diagram of the hand-held electronic device of FIG. 2 displaying channel code CH13.

Please refer to FIG. 4A, FIG. 4B and FIG. 4C at the same time. FIG. 4B is a diagram of the hand-held electronic device of FIG. 2 displaying channel code CH3. FIG. 4C is a diagram of the hand-held electronic device of FIG. 2 displaying channel code CH13. As indicated in FIG. 4A, the channel code CH2 displayed on the display unit 210 is calendar function 244a. As indicated in FIG. 4B, the channel code CH3 displayed on the display unit 210 is inbox function 244b. As indicated in FIG. 4C, the channel code CH13 displayed in the display unit 210 is calculator function 244c. In the present embodiment of the invention, by pressing the forward key 421 and the backward key 422, the hand-held electronic device 400 can switch to the inbox function 244b denoted by the channel code CH3 (as indicated in FIG. 4B) from the calendar function 244a denoted by channel code CH2 (as indicated in FIG. 4A) or can switch from the inbox function 244b denoted by the channel code CH3 (as indicated in FIG. 4B) to the calendar function 244a denoted by the channel code CH2 (as indicated in FIG. 4A).

Or, the user also can directly input a channel number n (indicated the channel number 13) by the number key 423, and switch from the calendar function 244a denoted by the channel code CH2 (as indicated in FIG. 4A) to the calculator function 244c denoted by the channel code CH13 (as indicated in FIG. 4C). The method of the present embodiment not only simplifies the operating method of a mobile phone and reduces the searching time of the desired function but also enables the user to perform the application mode of a mobile phone by way of channel surfing. Furthermore, the method of selecting application further inspires the user to learn the operation of the mobile phone and improve the convenience of using.

Please refer to FIG. 4A again, the input unit 230 can also include a volume control key 426 and a display button 425, wherein the volume control key 426 is used for controlling the volume of the hand-held electronic device 400, and the display button 425 enables the display unit 210 to display the channel code corresponding to the application 244 such as CH2 for example.

The method of selecting application of FIG. 3 is not limited to be used in the hand-held electronic device of FIGS. 4A~4C, and the hand-held electronic device of other types can also adapt to the method of selecting application of FIG. 3. Similarly, the block diagram of FIG. 2 is not limited to the hand-held electronic device of FIGS. 4A~4C, and the hand-held electronic device of other types can also adapt to the block diagram of FIG. 2. In the present embodiment of the invention, the channel code is a number; however, the channel code can be English alphabets or alphabets or symbols of other languages. The above channel code can be inputted via the QWERTY keypad of a hand-held electronic device or a keypad of other languages.

According to the method of selecting application and the hand-held electronic device disclosed in the above embodiment of the invention, the operation of the hand-held electronic device is simplified and the time is saved for searching the function by way of channel surfing. Besides, the method further inspires the user to find necessary applications by way of channel surfing. Moreover, as the operating method is simplified, the user is more willing to learn the operation of the hand-held electronic device, hence attracting consumers of various groups.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of selecting application used in a hand-held electronic device, wherein the hand-held electronic device is installed with a plurality of applications corresponding to a plurality of channel codes, the method of selecting application comprising:

receiving a first selecting signal outputted from an input unit of the hand-held electronic device for choosing a first one of the channel codes, wherein the input unit comprises a plurality of number keys, and the step of receiving the first selecting signal comprises:

outputting the first selecting signal by pressing one of the number keys;

driving the first application corresponding to the first chosen channel code; and displaying the first driven application on a display unit of the hand-held electronic device, wherein the hand-held electronic device comprises a display button, and the method further comprising:

pressing the display button for displaying the channel code corresponding to the first driven application on the display unit.

2. The method of selecting application according to claim 1, wherein the input unit further comprises a forward key and a backward key, the method of selecting application further comprising:

receiving a second selecting signal outputted from the input unit for choosing a second one of the channel codes, wherein the step of receiving the second selecting signal further comprises:

outputting the second selecting signal by pressing the forward key or the backward key;

driving the second application corresponding to the second chosen channel code; and displaying the second driven application on the display unit.

3. A method of selecting application used in a hand-held electronic device, wherein the hand-held electronic device is installed with a plurality of applications corresponding to a plurality of channel codes, the method of selecting application comprising:

displaying the first application corresponding to a first one of the channel codes;

receiving a second selecting signal outputted from an input unit of the hand-held electronic device for choosing a second one of the channel codes, wherein the input unit comprises a plurality of number keys, and the step of receiving the selecting signal comprises:

outputting the second selecting signal by pressing one of the number keys;

driving the second application corresponding to the second chosen channel code; and displaying the second driven application corresponding to the second chosen channel code on a display unit of the hand-held electronic device, wherein the hand-held electronic device comprises a display button, and the method further comprises:

pressing the display button for displaying the channel code corresponding to the first application on the display unit when the first application is displayed on the display unit or pressing the display button for displaying the channel code corresponding to the second driven application on the display unit when the second driven application is displayed on the display unit.

4. The method of selecting application according to claim 3, wherein the input unit further comprises a forward key and a backward key, the method of selecting application further comprising:

receiving a third selecting signal outputted from the input unit for choosing a third one of the channel codes, wherein the step of receiving the third selecting signal further comprises:

outputting the third selecting signal by pressing the forward key or the backward key;

driving the third application corresponding to the third chosen channel code; and displaying the third driven application on the display unit.

5. A hand-held electronic device, comprising:

a display unit;

a storage unit storing a plurality of applications corresponding to a plurality of channel codes;

an input unit comprising at least one number key used for outputting a selecting signal for choosing one of the channel codes;

a control unit used for driving the application corresponding to the chosen channel code and used for displaying the application on the display unit; and a display button for displaying the channel code corresponding to the application on the display unit.

6. The hand-held electronic device according to claim 5, wherein the input unit further comprises a forward key and a backward key for outputting another selecting signal.

7. The hand-held electronic device according to claim 5, further comprising:

a channel database having a channel reference table for storing the channel codes.

8. The hand-held electronic device according to claim 5, wherein the input unit further comprises a volume control key for controlling the volume of the hand-held electronic device.

* * * * *